Patented Nov. 14, 1922.

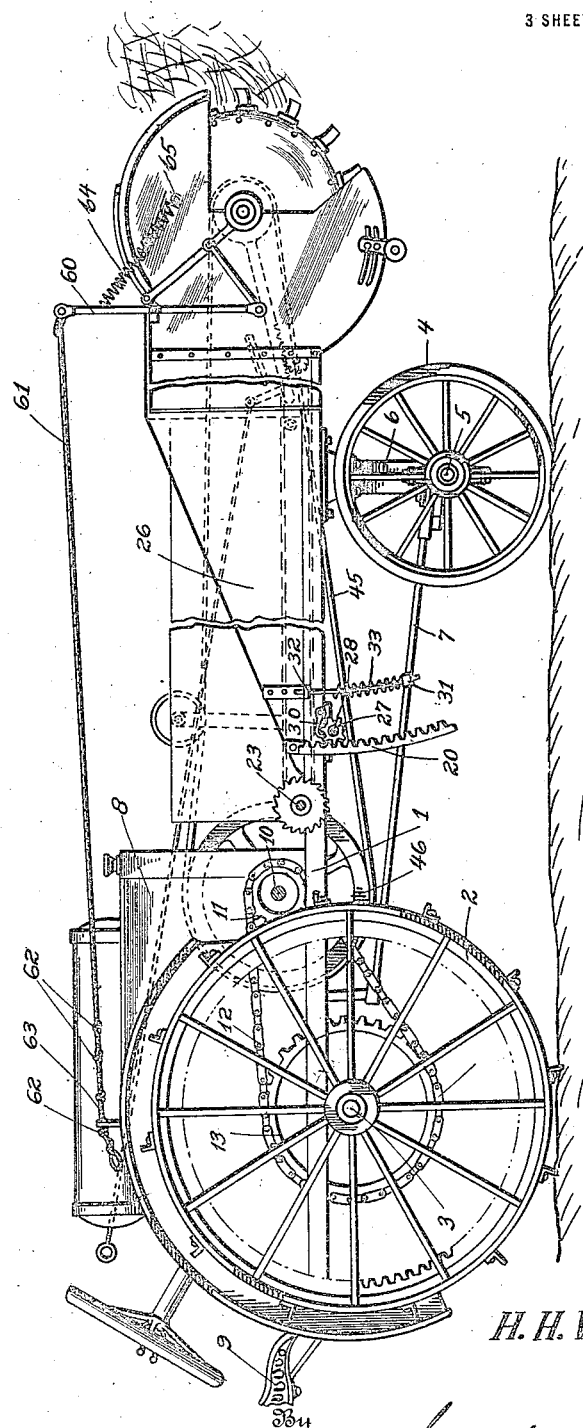

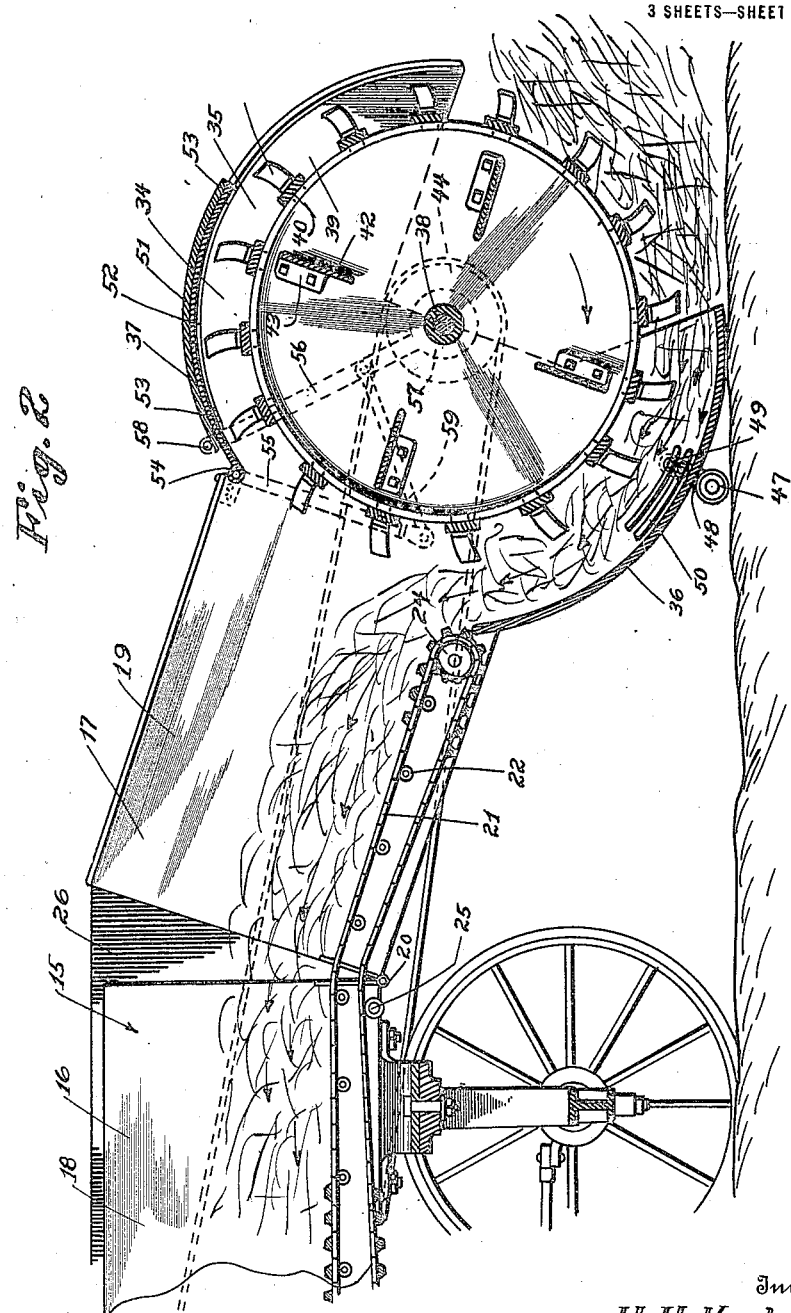

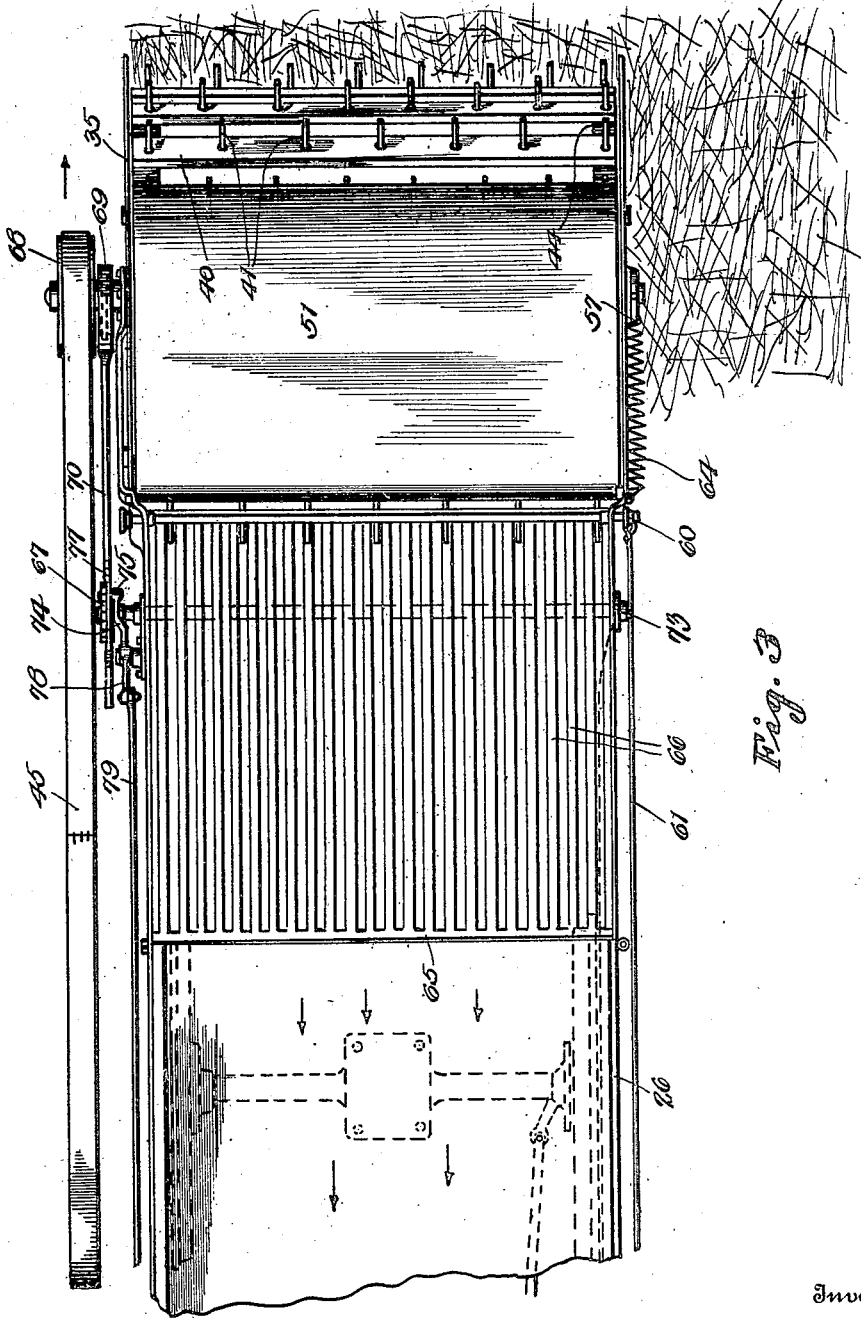

1,435,766

UNITED STATES PATENT OFFICE.

HIRAM H. VARLAND, OF SIOUX CITY, IOWA.

MANURE SPREADER.

Original application filed June 5, 1918, Serial No. 238,351. Divided and this application filed September 1, 1920. Serial No. 407,317.

*To all whom it may concern:*

Be it known that I, HIRAM H. VARLAND, a citizen of the United States, residing at Sioux City, in the county of Woodbury and State of Iowa, have invented certain new and useful Improvements in Manure Spreaders, of which the following is a specification.

This invention relates to manure loaders and spreaders and the present application is a division of my application filed June 5, 1918, Serial No. 238,351.

The loader and spreader embodying the invention in general is operable to work into a pile of manure and automatically load the same into the box of the machine after which the machine may be operated to distribute the load, and the machine embodies a beater cylinder which is rotatably mounted in a drop section of the box which may be lowered so as to bring the beater cylinder to such position that when rotated in one direction it will take up manure from the pile and deliver the same onto a traveling apron within the bottom of the box by which latter medium the manure is carried forwardly and loaded. This cylinder is also designed to operate to distribute or spread the manure when the machine is employed for this latter purpose.

One object of the present invention is to provide in connection with the beater, pneumatic blast means for assisting in loading the manure into the wagon box, this means consisting of a series of fan blades mounted within the beater cylinder or drum and adapted to create a forced current of air blowing in the direction of the adjacent end of the conveyor apron. At the same time this blast device will prove useful in the spreading of the manure as it will serve to blow the same in the direction in which it is to be deposited and will furthermore, prevent clogging of the beater teeth.

Another object of the invention is the provision of means for controlling the spread of the manure so that it may be thrown more or less directly toward the ground surface as desired, this means comprising a hood section working over the top of the casing in which the beater cylinder is mounted, and means for adjusting the said hood so that it will extend to a greater or less distance over or about the upper side of the said cylinder.

In the accompanying drawings:

Figure 1 is a side elevation of the combined loader and spreader embodying the present invention, the same being illustrated in operation to spread the manure;

Fig. 2 is a vertical longitudinal sectional view through one end of the machine illustrating the drop section lowered so that the beater cylinder may operate to load the manure from a pile into the box;

Fig. 3 is a top plan view of the end portion of the machine shown in Fig. 2.

In its general arrangement of parts, the machine embodying the present invention differs materially from manure spreaders now in use inasmuch as in the instance of the present machine, the manure is distributed or spread from the forward end of the bed or box of the machine instead of from the rear end thereof, the beater cylinder being located at the said forward end of the box and means being provided for propelling the machine over the ground surface. Due to this novel arrangement, the operator of the machine is enabled to at all times observe the manner in which the manure is being spread in the field and he may therefore correspondingly control the operation of the distributing mechanism to produce a lighter or a heavier spread as desired.

In the drawings the numeral 1 indicates in general the bed frame of the machine, and the numeral 2 indicates tractor wheels which support the rear end of this frame and which are fixedly mounted upon the end of an axle 3, the forward end of the bed frame being supported by ground wheels 4 freely rotatably mounted upon spindles 5 carried by the usual bolster 6. Suitable steering mechanism indicated in general by the numeral 7 is, of course, connected with the spindles 5 to provide for steering the mechanism in its travel. The numeral 8 indicates in general an engine, such for example as an internal combustion engine which is mounted upon the bed frame 1 at the rear end thereof and in front of the operator's seat which latter is indicated by the numeral 9. The engine shaft is indicated by the numeral 10, and loosely mounted upon this shaft at one end thereof is a sprocket gear 11 about which is passed a sprocket chain 12 which chain is passed also about a sprocket gear 13 fixed upon one end of the axle 3. Any suitable clutch device may be provided for the purpose of clutching the gear 11 with the engine shaft when it is desired to cause travel of the machine over the field and for unclutching the said gear when it is desired to arrest the movement of the machine or to bring into operation a means which is described in my said copending application and which operates to advance the machine with a step by step motion during the loading operation.

The box of the machine is indicated in general by the numeral 15 and this box as a whole is divided transversely at a point immediately in advance of the bolster 6 so as to provide front and rear sections indicated respectively by the numerals 16 and 17. The bed frame of the machine is correspondingly divided and it may, for the sake of clearness, be considered as a part of the box 15. The box sections 16 and 17 include side walls indicated respectively by the numerals 18 and 19 and of course the conveyor apron usually employed in machines of this type constitute the bottom of the said box. The sections 16 and 17 of the box and bed frame are connected by a pivot joint 20 so that the section 17 may have downward pivotal movement to substantially the position shown in Fig. 2 of the drawings and, in the operation of the machine as a spreader, may be caused to assume an upright or normal position as shown in Fig. 1. The forward section of the box may, in view of the foregoing, be considered as a drop section and of course when dropped to the position shown in Fig. 2 it will permit of loading of the box as a whole, it being on the other hand raised to the position shown in Fig. 1 when the machine is to be employed as a spreader.

The endless conveyor apron above mentioned is indicated in general by the numeral 21 and the upper stretch thereof passes over rollers 22 as is usual in machines of this class. The apron at its rear end passes about a shaft 23 rotatably journaled in suitable bearings at the rear end of the box 15, and at its forward end the apron passes about a shaft 24 journaled in suitable bearings at the forward end of the box. Of course, when the forward or drop section of the box is dropped or swung downwardly to loading position, the forward portion of the conveyor apron will be deflected in a downward direction, and in order that the lower stretch of the said apron may be supported at the time of so adjusting the said section of the box the said lower stretch of the apron passes over an idle roller 25 mounted immediately rearwardly of the hinge connection 20 between the fixed and dropped sections of the box. Secured in any suitable manner to the outer faces of the side walls 19 of the section 17 of the box are metallic plates 26 which extend rearwardly and close beside the side walls of the section 16 of the said box, the said plates constituting lever arms in a manner which will now be explained. While the members 26 are illustrated in the drawings as in the form of metallic plates, these members may be of frame-like structure although it is preferable to employ plates, as said members will then serve to span and close the gap between the forward ends of the walls 18 and the rear ends of the walls 19 when the drop section of the box is swung downwardly. In order to provide for swinging of the members 26 and thereby raise or lower the drop section of the box as may be desired, a shaft 27 is mounted in suitable bearings transversely beneath the frame 1 of the machine and carries pinions 28 which mesh with arcuate racks 29 which racks are secured at their upper ends to the respective members 26 at the rear end of the said members as clearly shown in Fig. 1 of the drawings. One end of the shaft 27 is preferably squared for the application thereto of a crank handle (not shown) whereby it may be rotated, and it will be understood that when the shaft is rotated in one direction, the arcuate racks 29 will be moved upwardly to permit of lowering of the drop section to the loading position and when the shaft is rotated in the opposite direction, the racks will be moved downwardly so as to raise the said drop section to spreading position. A pawl 30 is provided for coaction with one of the pinions 28 so as to hold the shaft against rotation when the drop section has been adjusted to the desired position. In order to suitably cushion the lowering movement of the drop section, curved rods 31 are suitably secured at their upper ends to the members 26 and work through suitable guides 32 upon the respective sides of the bed frame 1. A spring 33 is arranged upon each of the rods 31 and by engagement with the respective guide 32, will serve the purpose above stated. Inasmuch as the drop section carries the beater cylinder and other parts to be hereinafter described, there is considerably more weight at the forward side of the hinge for the said section than at the rear side of the said hinge and, consequently, the tendency is for the said section to swing to its lowered position. Therefore, in order to lower the section it is not necessary to manually rotate the shaft 27 as it may be freed for rotation by lifting the pawl 30 out of engagement with the pinion 28. Then the downward or dropping movement of the section 17 will be cushioned by the spring 33 as above pointed out.

The beater cylinder of the machine is housed within a casing indicated in general by the numeral 34. The side walls of this casing are indicated by the numeral 35 and form a continuation of the respective side walls 19 of the drop section 17 of the box. The casing further includes a downwardly and forwardly curving bottom wall 36 and an upwardly and forwardly curving top wall 37. The bottom wall 36 of the casing is so curved and proportioned that when the drop section of the box is in lowered to loading position as shown in Fig. 2, the forward edge of the said bottom wall will lie close to the ground surface. It will be understood, of course, that the casing is open at its front inasmuch as the top wall 37 and bottom wall 36 have their forward edges terminating but slightly in advance of the transverse vertical plane in which the beater shaft is located. This shaft is indicated by the numeral 38 and is rotatably mounted in suitable bearings upon the side walls 35 of the casing and has fixed upon it the spaced heads 39 of the beater cylinder or drum. The usual slats 40 are secured at their ends to the peripheries of the heads 39 and complete the said cylinder or drum, and these slats support the beater teeth which are indicated by the numeral 41, and which teeth, in the rotation of the beater cylinder, are designed to throw or scatter the manure in a forward direction when the machine is being employed as a spreader and to pick the manure from the pile and throw it in a rearward direction and onto the apron 21 when the machine is being loaded. In order that a blast of air may be created in the rotation of the beater cylinder, it is preferable that fan blades 42 be provided, these blades being secured at their ends as at 43 to the inner or opposed faces of the heads 39 of the cylinder, as clearly shown in Fig. 2 of the drawings. The outer edges of the fan blades are located close to the periphery of the cylinder whereas their inner edges are spaced a suitable distance from the shaft 38. Of course, in the rotation of the cylinder both in the spreading and loading operations, the fan blades 42 will create a blast of air which will greatly assist in spreading the manure in the first instance and blowing the same rearwardly, in the latter instance. Also this air blast will serve effectually to prevent clogging of the teeth of the beater cylinder in both operations of the machine. By reference to Fig. 2 of the drawings it will be observed that the shaft 24 for the conveyor apron 21 is located immediately rearwardly of the beater cylinder so that in the spreading or distributing operation of the machine, in which operation the upper stretch of the apron 21 moves forwardly, the load of manure will be gradually fed toward the cylinder as material is picked from the load by the beater teeth and spread or distributed. Of course, in the loading operation of the machine the beater teeth in passing at the open side of the casing for the beater cylinder, will gather or pick material from the pile and throw the same in a rearward direction and on to the said apron 21. Inasmuch as in the first-mentioned operation of the machine the upper and rear sides of the cylinder are the effective or working sides, and in the loading operation of the machine the forward and under sides are the effective or working sides, the cylinder is, in both operations, rotated in the same direction. In order to impart rotary motion to the cylinder, a pulley 44 is fixed upon the shaft 38, and a belt 45 is passed about this pulley and also about a pulley 46 fixed upon the engine shaft 10. As before stated, when the drop section of the box is in loading position as shown in Fig. 2 of the drawings, the forward edge of the bottom wall 36 of the casing housing the beater cylinder will be located in close proximity to the ground surface, but in order to prevent this edge digging into the soil or coming in contact with raised portions of the ground surface, rollers 47 are provided for supporting the casing for passage over the ground surface. These rollers are mounted for free rotation at the lower ends of bracket plates 48 disposed against the outer sides of the side walls 35 of the beater cylinder casing and held in place by means of bolts 49 which are adjustably received in arcuate slots 50 formed in the said side walls 35. It will be apparent and particularly by reference to Figs. 1 and 2 of the drawings, that the rollers 47 may be adjusted toward and from the forward edge of the bottom wall 36 of the casing 34 by loosening the bolts 49 and then sliding the bracket plates 48 along the side walls 35 of the said casing in a forward or rearward direction and then again tightening the bolts.

Upon reference to Fig. 1 of the drawings it will be readily understood that when the machine is in use as a spreader, the upper stretch of the apron 21 will be traveling in the direction of the beater cylinder, and as the cylinder rotates the beater teeth 41 will pick up the manure as it is fed to the cylinder and will throw or scatter the same in a forward direction, the manure being, of course, discharged through the open forward side of the casing 34. Usually it will be desirable to leave the said side of the casing entirely open as shown in Fig. 2 to provide for a more thorough scattering of the material, but when the machine is in operation in windy weather it is desirable that means be provided for partly closing the open side of the casing, especially the upper portion of the said open side so that the manure will be deposited more nearly in a direct downward direction on to the ground surface, as otherwise the wind would blow the material to one side to such an extent that an even swath could not be deposited. Therefore, in order to accomplish the desired result the top wall 37 of the casing 34 is supplemented by an adjustable hood which may occupy the position shown in Fig. 2 or may be moved to a greater or less distance in a forward direction and consequently to extend forwardly beyond the forward edge of the said top wall 37. This hood is indicated by the numeral 51 and the same comprises an arcuate plate of substantially the same dimensions as the top wall 37, the hood being disposed concentrically with relation to the shaft 38 and the said top wall 37 and exteriorly of the said wall. To guide the hood and hold the same assembled with the casing 34, the side walls of the casing are formed with arcuate slots 52 which extend from a point adjacent the rear end of the top wall 37 to a point nearly horizontally opposite the shaft 38. At the corners of the hood 51, the plate comprising the hood is provided with downstruck ears or lugs 53 which work in the said slots 52 so that the hood is in this manner supported for concentric backward and forward movement upon the top of the casing and is at the same time secured against outward separation from the casing. In order to provide for adjustment of the hood from the operator's position upon the machine, a shaft 54 is rotatably mounted at the rear end of the wall 37 and fixed upon each end of the shaft is a lever arm 55. Lever arms 56 are provided with collars 57 which loosely fit the ends of the shaft 38, and which collars provide for swinging movement of the arms 56 about the shaft as a center. The arms 56 are pivotally connected at their outer or upper ends as at 58 with the rear corners of the hood 51, and connecting bars or links 59 are connected with the arms 56 and the lower ends of the respective arms 55. The arm 55 is provided with an upward extension indicated by the numeral 60 and to the upper end of this extension is connected one end of a flexible element, such for example as a rope or cable indicated by the numeral 61. This flexable element is led rearwardly and is provided at intervals throughout its rear portion with knots or other abutment elements 62 which may be selectively brought into engagement with any suitable keeper device 63. A spring 64 is connected at one end as at 65 to that side wall of the casing 34 at which the lever arm carrying the extension 60 is located and the other end of this spring is connected to the said extension of the lever arm. By reference to Figure 1 of the drawings it will be understood at this point that the spring 64 exerts a pull upon the extension of the lever arm 55 in a manner to cause the said arm to in turn exert a pull upon the connecting bar 59 and, therefore, the hood 51 is normally held at the rear limit of its movement. However, by pulling upon the cable 61 and swinging the lever arm against the tension of the spring 64, the hood will be rotated in a forward direction to more or less completely cover and close the upper side of the open front of the casing 34. The hood may be held in adjusted position by engaging a selected one of the knots or abutments 62 with the keeper device 63.

It will be understood, of course, that any desired means may be provided for imparting travel to the apron 21, one such means being disclosed in my said copending application.

Having thus described the invention, what is claimed as new is:

1. In a spreader, a box, a casing at one end of the box having closed sides, a closed top, and a closed bottom, the casing having an open side communicating with the box and an opposite open side for the passage of the material, a hood adjustable with relation to the top and to the last-mentioned open side of the casing, and a beater rotatably mounted within the casing.

2. In a spreader, a box, a casing at one end of the box having closed sides, a closed arcuate top, and a closed bottom, the casing having an open side communicating with the box and an opposite open side for the passage of the material, a hood movable concentrically with the said arcuate top of the casing, means supporting the hood for such movement, means for adjusting the hood with relation to the said top and to the last-mentioned open side of the casing whereby under appropriate conditions the upper portion of the last-mentioned open side may be more or less closed so as to direct the material in a downward direction rather than broadcast, and a beater rotatably mounted within the casing.

3. In a spreader, a box, a casing at one end of the box having closed sides, a closed arcuate top, and a closed bottom, the casing having an open side communicating with the box and an opposite open side for the passage of the material, arms mounted for swinging movement, a hood supported by swinging movement above the said arms for movement above the said closed top and in one position adapted to overlie said top within the bounds thereof and in another position adapted to extend to a greater or less extent over the upper portion of the last-mentioned open side of the casing to more or less close said side, means connected with one of the arms and operable to adjust the said hood, and a beater rotatably mounted within the casing.

4. In a spreader, a box, a casing at one end of the box having closed sides, a closed arcuate top, and a closed bottom, the casing having an open side communicating with the box and an opposite open side for the passage of the material, arms mounted for swinging movement, a hood supported by said arms for movement above the said closed top and in one position adapted to overlie said top within the bounds thereof and in another position adapted to extend to a greater or less extent over the upper portion of the last-mentioned open side of the casing to more or less close said side, means connected with one of the arms and operable to adjust the said hood, a spring connected with one of said arms for yieldably holding the same in position to maintain the hood in full open position, and a beater rotatably mounted within the casing.

In testimony whereof I affix my signature.

HIRAM H. VARLAND. [L. S.]